United States Patent

Kay

[15] 3,646,272

[45] Feb. 29, 1972

[54] TIME DIVISION MULTIPLEX SYSTEM FOR THE TRANSMISSION OF SIGNALS BY MEANS OF PULSE CODE MODULATION

[72] Inventor: Malcolm John Kay, Lockeys, South Australia

[73] Assignee: U.S. Philips Corporation, New York, N.Y.

[22] Filed: May 5, 1970

[21] Appl. No.: 34,817

[30] Foreign Application Priority Data

May 16, 1969 Australia ............................55110/69

[52] U.S. Cl. ........................................................179/15 AP

[51] Int. Cl. ..........................................................H04j 3/02

[58] Field of Search......................179/15 AP, 15 AY, 15 BS; 325/38 B

[56] References Cited

UNITED STATES PATENTS 3,423,534 1/1969 Pan.................................179/15 AY

*Primary Examiner*—Ralph D. Blakeslee

*Attorney*—Frank R. Trifari

[57] ABSTRACT

A transmission system for pulse code modulation uses time division multiplex with an improved synchronization system to provide very reliable signal synchronization even in the presence of a high degree of interference.

5 Claims, 2 Drawing Figures

Patented Feb. 29, 1972

3,646,272

2 Sheets-Sheet 1

INVENTOR.

MALCOLM JOHN KAY

BY

AGENT

INVENTOR.
MALCOLM JOHN KAY
BY
AGENT

TIME DIVISION MULTIPLEX SYSTEM FOR THE TRANSMISSION OF SIGNALS BY MEANS OF PULSE CODE MODULATION

The invention relates to a transmission system comprising a transmitter and a receiver for the transmission of a number of signals in time division multiplex and by means of pulse code modulation, in particular delta modulation, the transmitter comprising channels which are operative in time division multiplex and consist of a number of signal channels and at least one synchronization channel, in which transmitter the signal pulses originating from the various signal channels and the synchronization pulses originating from the synchronization channel are cyclically distributed in each signal cycle, within which a number of signal intervals and also a synchronization interval occur in a cyclic sequence, over the separate intervals by means of a channel distributor, all the transmitted pulses being equal mutually and coinciding with various pulses from a series of equidistant clock pulses. The receiver comprises a clock frequency extractor for recovering the series of clock pulses from the received multiplex signals and furthermore comprises a number of channels corresponding to the number of channels in the transmitter and also consisting of a number of signal channels and at least one synchronization channel, the received multiplex signals being distributed cyclically over the separate channels by means of a channel distributor under the control of the recovered clock pulses, the synchronization channel comprising a synchronism detector which controls a setting circuit in the channel distributor, said setting circuit being blocked in the case of synchronism of the channel distributors in the transmitter and the receiver and, in the case of absent synchronism, setting the channel distributor in the receiver always at a different interval of the received signal cycle.

In such time division multiplex systems particular attention should be paid to the method of synchronization of the channel distributors in the transmitter and the receiver since, when synchronism is absent, all the channels in the receiver are disturbed. It should be prevented in particular that signal information or an interference takes over or disturbs the function of the synchronization channel.

It is the object of the invention to provide time division multiplex transmission systems of the type mentioned in the preamble, a synchronization method which ensures a very reliable synchronization also in the case of a very high degree of interference of the multiplex signals in the transmission path, for example, with probabilities of interference of —:10, and in the case of abnormal operating conditions of the signal channels, for example, channel failure or long lasting channel overload, a very short searching time being realized while the reliability is maintained.

The transmission system according to the invention is characterized in that a pulse pattern generator is included in the synchronization channel of the transmitter to generate a periodic synchronization pulse pattern which, considered already over a time interval equal to its own period and for all the operating conditions of the signal channels, is uncorrelated with the signal pulses originating from said signal channels, the synchronism detector in the receiver comprising the following elements:

1. a pulse pattern converter provided with a shift register, the content of which is shifted under the control of the recovered clock pulses, which pulse pattern converter converts the received synchronization pulse pattern into a series of equidistant pulses;

2. a test pulse generator which supplies test pulses having a recurrence period equal to an integral number of times the period of the synchronization pulse pattern;

3. an error counter which allows changes of its position only at instants determined by the test pulses, which error counter supplies an error pulse exclusively when a predetermined number of immediately succeeding pulses from the series of equidistant pulses of the pulse pattern converter fails;

4. a control circuit connected to the setting circuit of the channel distributor and comprising a memory which has four different conditions which each correspond to only one of the following synchronization stages:

a. synchronism absent.

b. testing stage.

c. checking stage.

d. synchronism, in which all the transitions between the synchronization stages occur under the control of the instantaneous memory conditions and furthermore the transition from stage *a* to stage *b* is effected by the first test pulse which occurs in stage *a*, the transition from stage *b* to stage *c* is effected by a pulse from the series of equidistant pulses of the pulse pattern converter which occurs prior to or at the instant of the next following test pulse in stage *b*, said test pulse effecting the return from stage *b* to stage *a* when a pulse from the series of equidistant pulses fails during the above-mentioned interval, the transition from stage *c* to stage *d* is effected by a pulse from the series of equidistant pulses of the pulse pattern converter which occurs at the instant of the first test pulse in stage *c*, said test pulse effecting the return from stage *c* to stage *a* when a pulse from said series of equidistant pulses fails at the above-mentioned instant, the return from stage *d* to stage *a* is effected by an error pulse from the error counter, the control circuit supplying a control pulse in each return to stage *a* for releasing the setting circuit of the channel distributor and the control circuit furthermore supplying a reset pulse in each transition from stage *b* to stage *c* to reset the test pulse generator to its initial position.

When the synchronization pulse pattern is denoted by $s(t)$, its period by T, and any pulse pattern from the collection of signal pulse patterns of the signal channels by $s(t)$, the uncorrelated conditions of $s(t)$ and $s(t)$ is to be understood to mean that the integral $$\overline{I(\tau) = \int_0^T s(t)s(t-\tau)dt} \qquad (1)$$

is substantially zero for all the values $\tau$, in formula:

$$\overline{I(\tau)} \approx 0; -\infty \leq \tau \leq \infty; \tau \neq 0 \qquad (2)$$

or in other words that the probability that the synchronization pulse pattern $s(t)$ is found in the collection of signal pulse patterns $[a(t)]$ is particularly small.

The invention and its advantages will now be described in detail with reference to the Figures.

FIG. 1 shows a transmission system according to the invention, while

FIG. 1 shows a time division multiplex transmission system for the transmission of 15 speech signals by means of the particular form of pulse code modulation which is known as delta modulation.

Figure 1:
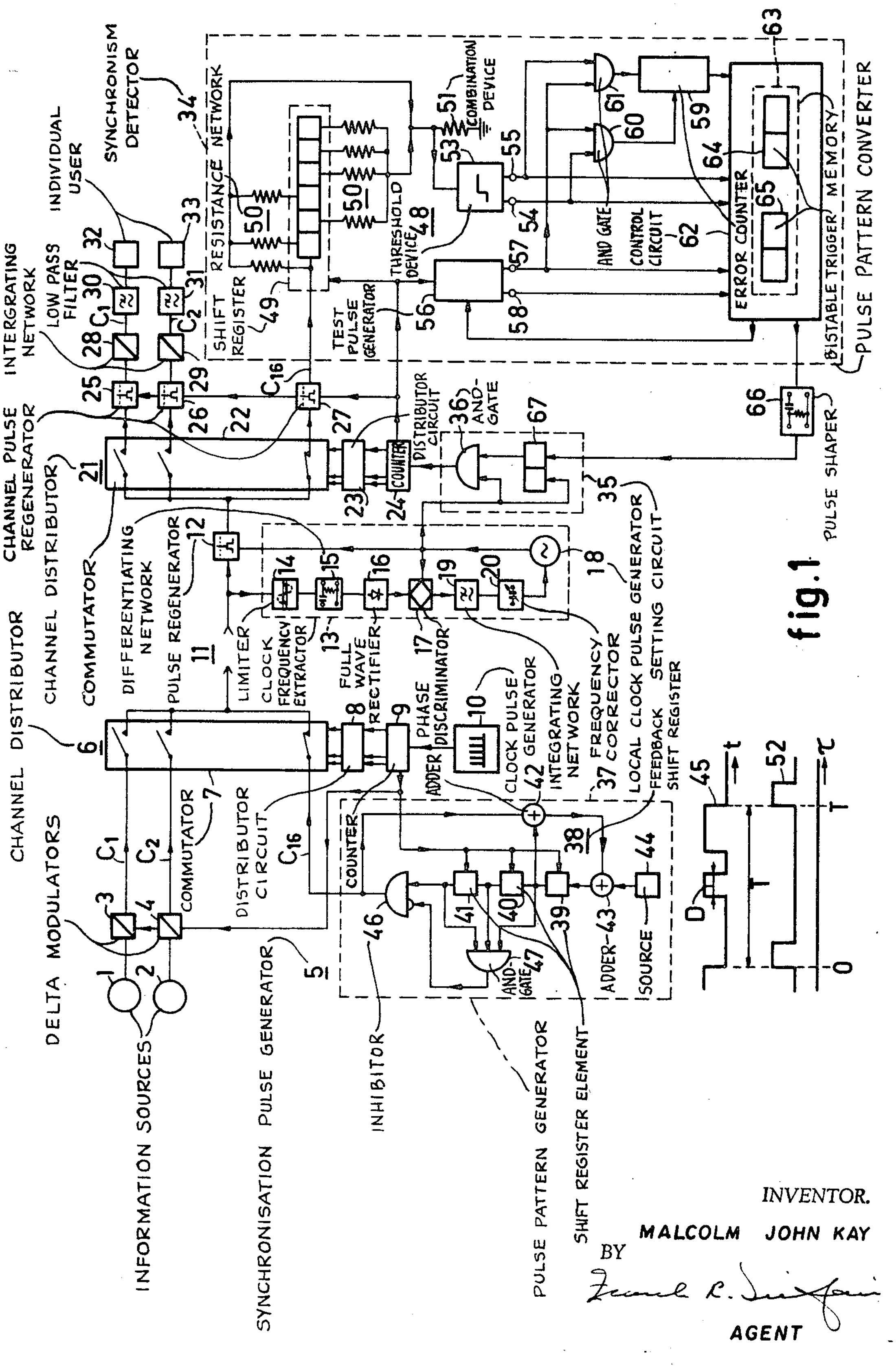

For this purpose the transmitter comprises 16 channels $C_1$–$C_{16}$ operative in time division multiplex, namely 15 speech channels $C_1$–$C_{15}$ and one synchronization channel $C_{16}$. Speech signals originating from information sources 1, 2,... are applied in the speech channels $C_1$–$C_{16}$ to analog-to-digital converters in the form of delta modulators 3, 4, ... and converted therein into signal pulses which, in an alternation dependent upon the speech signals to be transmitted, are present and absent, while the synchronization channel $C_{16}$ comprises a synchronization pulse generator 5 which supplied synchronization pulses. The signal pulses originating from the speech channels $C_1$–$C_{15}$ and the synchronization pulses originating from the synchronization channel $C_{16}$ are distributed cyclically by means of a channel distributor 6 over the separate intervals of each signal cycle which is subdivided in 16 intervals of equal duration, 15 of which serving as signal intervals and one serving as a synchronization interval. The channel distributor 6 is of a conventional construction and in the embodiment shown it comprises a commutator 7 having 16 separate inputs for the 15 speech channels $C_1$–$C_{15}$ and the synchronization channel $C_{16}$, which commutator inputs are successively connected to the commutator output during the intervals slotted to the channels individually under the control of the output signals of a distributor circuit 8. The distributor circuit 8 is in the form, for example, of 16 AND-gates not shown in FIG. 1, the inputs of which are connected to the stages of a 16-counter 9 to which clock pulses originating from a clock pulse generator 10 are applied in such manner that each AND-gate supplies an output signal only in one particular position of the counter 9, so as to connect the commutator input associated with the AND-gate to the commutator output. All the pulses occurring at the commutator output are mutually equal and coincide with various pulses from the series of clock pulses of the clock pulse generator 10, the clock pulse frequency being, for example, 320 kc./s. In order to control the delta modulators 3, 4,... in the speech channels $C_1$–$C_{15}$ and the synchronization pulse generator 5 in the synchronization channel $C_{16}$, the channel clock pulses are also derived from the counter 9; the channel clock pulse frequency and the signal cycle frequency is then 20 kc./s.

The multiplex signals transmitted by the transmitter are transmitted, through a transmission path 11, to the receiver and are applied therein to a pulse regenerator 12 for regenerating the received signal pulses according to shape and instant of occurring. For that purpose the receiver comprises a clock frequency extractor 13 for recovering the series of clock pulses from the received multiplex signals. In the embodiment shown the clock frequency extractor 13 comprises a limiter 14 which is succeeded by a differentiating network 15 for the limited signal pulses and a fullwave rectifier 16 which is connected to one input of a phase discriminator 17. The other input of the phase discriminator 17 is connected to a local clock pulse generator 18, while the output is connected to a smoothing filter in the form of an integrating network 19, the output voltage of which is applied as a control voltage to a frequency corrector 20 constructed, for example, as a variable reactance, for the automatic phase stabilization of the local clock pulse generator 18 at the clock pulses generator 10 at the transmitter end. The local clock pulses thus obtained are applied to an input of the pulse regenerator 12.

The receiver, like the transmitter, further comprises 16 channels consisting of 15 speech channels $C_1$–$C_{15}$ and one synchronization channel $C_{16}$, the received and regenerated multiplex signals being distributed cyclically over the separate channels by means of a channel distributor 21 which, as far as its construction and control are concerned, corresponds to the channel distributor 6 at the transmitter end and which also comprises a commutator 22, a distributor circuit 23 and a 16-counter 24, the local clock pulses being applied to the counter 24. The pulses associated with the various channels $C_1$–$C_{16}$ appear at the commutator outputs and are applied in all channels to channel pulse regenerators 25, 26, 27, ... which are controlled by the channel clock pulses derived from the counter 24.

In the speech channels $C_1$–$C_{15}$ the regenerated signal pulses are applied to digital-to-analog converters in the form of integrating networks 28, 29,... associated with the delta modulators, the output voltage of which, after filtering in low-pass filters 30, 31..., is applied to individual users 32, 33,... In the synchronization channel $C_{16}$ the regenerated synchronization pulses are applied to a synchronism detector 34 which controls a setting circuit 35 in the channel distributor 21. In the embodiment shown the setting circuit 35 comprises AND-gate 36 and bistable trigger 67 to which are applied on the one hand the local clock pulses and on the other hand a control signal generated by the synchronism detector 34 and coupled through pulse shaper 66. In the case of synchronism of the channel distributors 6 and 21 in the transmitter and the receiver, that is to say with corresponding positions of commutators 7, 22, in which the pulses of each channel at the transmitter end are applied correctly to the associated channel at the receiver end, the setting circuit 35 is blocked which means that the control signal which is then generated allows the local clock pulses to pass the AND-gate 36 without hindrance. When the multiplex system is actuated for the first time or when synchronism is lost, the control signal which is then generated prevents the passage of the local clock pulses through the AND-gate 36 so that the channel distributor 21 at the receiver end is lagging with respect to the channel distributor 6 at the transmitter end, and thus always sets at a different interval of the received signal cycle until synchronism is obtained.

In order to obtain in all operating conditions a reliable synchronization, that is to say, a synchronization which is substantially not influenced by signal pulses or interference pulses, according to the invention a pulse pattern generator 37 is included in the synchronization channel $C_{16}$ of the transmitter in the delta-modulation time division multiplex system shown to generate a periodic synchronization pulse pattern which, considered already over a time interval equal to its own period and for all the operating conditions of the signal channels $C_1$–$C_{15}$, is uncorrelated with the signal pulses originating from the said signal channels.

In the embodiment shown in FIG. 1, the pulse pattern generator 37 is constructed as a feedback shift register 38 having a number of shift register elements 39, 40, 41, the content of which is shifted with a constant shift period D under the control of the channel clock pulses originating from the counter 9, and having a modulo-2-adder 42, one input of which is connected to the output of the shift register element 39 and the other input of which is connected to the output of the shift register 38, the output of said modulo-2-adder 42 being connected to a second modulo-2-adder 43 which is connected to the input of the shift register to which is also connected a source 44 of constant signal value.

If, when the pulse pattern generator 37 is put into operation, the source 44 supplies a constant signal having an amplitude equal to that of a pulse at the shift register 38, the shift register 38, as a result of the feedback coupling, will start generating a series of pulses having an each time recurring period T. Mathematically it can be proved that the pulse pattern occurring when $n$ shift register elements are used and with suitable choice of the place of the modulo-2-adders, has a period $(2^n-1)$D, where D is the length of the shift period. In the embodiment shown, in which $n=3$, the period T of the synchronization pulse pattern is $(2^3-1)D=7D$, while the synchronization pulse pattern at the output of the shift register 38 has the shape shown in the time diagram 45 below pulse pattern generator 37.

In order to prevent, in the practical embodiment of the pulse pattern generator 37 shown in FIG. 1, a tendency of undesired generation of an uninterrupted series of pulses, which might occur in particular circumstances, a normally opened inhibiter 46 is provided between the output of the shift register and the feedback coupling the inhibiting terminal of which is connected to an AND-gate 47 to which the outputs of all the shift register elements 39–41 are connected. If actually the pulse pattern generator 37 would be in that condition in which an uninterrupted series of pulses is generated, then a pulse appears at the outputs of all the shift register elements 39–41 simultaneously, so that at the output of the AND-gate 47 a pulse appears which closes the inhibitor 46 and thus immediately interrupts the continuation of this undesired condition of the pulse pattern generator 37.

According to the invention, a pulse pattern converter 48 is incorporated in the synchronism detector 34 of the receiver, which converter comprises a shift register 49 the content of which is shifted under the control of the recovered clock pulses and which converts the received synchronization pulse pattern into a series of equidistant pulses.

FIG. 1 shows a particularly attractive pulse pattern converter 48, in which the uncorrelated condition of the synchronization pulse pattern $s(t)$ with any other signal pulse pattern $s(t)$ is used elegantly for the construction of the pulse pattern converter 48.

The pulse pattern converter 48 shown comprises a shift register 49 which is provided with a number of shift register elements adapted to the number of channel clock pulse periods in the synchronization pulse pattern, namely a number which is smaller by one than this number of channel clock pulse periods, so in this case 6, the contents of which shift register elements are shifted under the control of the local channel clock pulses; said control is not shown in FIG. 1 in order to avoid complexity of the drawing. The outputs of all the shift register elements are connected through a resistance network 50 having mutually equal resistors, to a combination device in the form of a resistor 51, the resistors being connected to the shift register elements in such manner that the resistance network 50 forms a replica of the synchronization pulse pattern $s(t)$ in a given phase, for example, in FIG. 1 a replica for the phase of the pulse pattern $s(t)$ shown in the time diagram 45 at pulse pattern generator 37. For that purpose, each shift register element in which a pulse is present when the shift register content corresponds to the synchronization pulse pattern in the said phase, is directly connected with its output to its associated resistor, whereas each shift register element in which then a pulse is absent is connected with its output to its associated resistor through an inverter. When using bistable triggers as shift register elements, the inverters may be omitted, however, since both the pulses and the inverted pulses can be derived from this type of shift register elements. Furthermore, the input of the shift register is also connected to such a resistor, namely directly in the example shown.

The supply of the synchronization pulse pattern to said pulse pattern converter 48 then results in an output signal of the combination device 51 which has a maximum value when the synchronization pulse pattern is present in the shift register 48 in the desired phase and has a constant minimum value when the synchronization pulse pattern is present in the shift register 49 in another phase. When the time shift of the synchronization pulse pattern relative to that in the desired phase is denoted by $\tau$, then the output signal of the combination device 51, as a function of $\tau$, has the variation shown in the time diagram 52 below the pulse pattern generator 37. A series of equidistant pulses having an amplitude equal to the maximum value and a period T which is equal to that of the synchronization pulse pattern thus appears at the output of the combination device 51. When any other sign 1 pulse pattern is applied on the contrary, a stepwise varying signal will appear at the output of the combination device 51 which, on the basis of the uncorrelated condition with the synchronization pulse pattern, remains far below the maximum value.

A threshold device 53, the threshold value of which is adjusted, for example, at 0.8 times the maximum value of the output signal of the combination device 51, taking into account the given probability of interference, is connected to the combination device 51. A series of equidistant pulses which has a period T appears at the output 54 of the threshold device 53 only when the synchronization pulse pattern or a close approximation thereof is applied to the pulse pattern converter 48. In this respect, it will be appreciated that small deviations of the synchronization pulse pattern can occur due to errors arising in the transmission path. In the case of the example shown where the threshold value is adjusted to 0.8 times the maximum value of the output signal, the series of equidistant pulses will be maintained for patterns differing by one digit from the synchronization pulse pattern. Furthermore, the threshold device 53 is constructed so that at the output 55 the inverse signal of the output 54 appears; for example, if a pulse is present at the output 54, then no pulse is present at the output 55, and conversely.

In accordance with the invention, the synchronism detector 34 comprises as a second element a test pulse generator 56 which supplies test pulses having a recurrence period equal to an integral number of times the period T of the synchronization pulse pattern.

In the synchronism detector shown in FIG. 1, the test pulse generator 56 is constructed as a counter which is supplied by the channel clock pulses of the 16-counter 24 and which, after the supply of a number of channel clock pulses equal to the number of channel clock pulse periods in the synchronization pulse pattern, so in this case 7, reaches its final position and then supplies a test pulse of a duration equal to a channel clock pulse period to the output 57. The counter 56 is also provided with an output 58 at which a test pulse appears when the counter takes its initial position.

As a third element of synchronism detector 34 comprises an error counter 59 which allows changes of its position only at instants determined by the test pulses of the test pulse generator 56, which error counter 59 supplies an error pulse only when a predetermined number of immediately succeeding pulses from the series of equidistant pulses of the pulse pattern converter 48 fails.

In the embodiment shown an AND-gate 60 is connected to the reset input of the error counter 59 and an AND-gate 61 is connected to the counter input, to which AND-gates 60, 61 the test pulses originating from the output 57 of the test pulse generator 56 are applied. As will be described in detail below, the series of equidistant pulses at the output 54 of the threshold device 53 in the pulse pattern converter 48 coincides, in the case of synchronism, with the series of test pulses at the output 57 of the test pulse generator 56. If now, in the case of synchronism, a pulse from the series of equidistant pulses at the output 54 of the threshold device 53 occurs simultaneously with a test pulse, then this pulse is passed by the AND-gate 60 and applied to the error counter 59 as a reset pulse so that the error counter 59 will assume its initial position. If, however, in the case of synchronism, a pulse from the series of equidistant pulses fails at the output 54 of the threshold device 53 as a result of the interferences, a pulse does appear simultaneously with a test pulse at the output 55 of the threshold device 53 and is passed by the AND-gate 61 and is counted in the error counter 59. The number of stages of the error counter 59 is chosen to be so, taking into account the given probability of interference, that the error counter 59 reaches its final position only when, for example, 8 successive pulses fail from the series of equidistant pulses and then supplies an error pulse. So the error counter 59 functions as an integrator for the series of equidistant pulses the content of which remains constant when the series of equidistant pulses is applied, but the content of which is lost after failing 8 successive pulses from this series of equidistant pulses, the final position of the error counter 59 constituting a threshold to indicate said failure.

In accordance with the invention, the synchronism detector 34 comprises as a fourth element a control circuit 62 connected to the setting circuit 35 of the channel distributor 21 and provided with a memory 63 which has four different conditions which each correspond to only one of the following synchronization stages:

a. synchronism absent,
b. testing stage,
c. checking stage,
d. synchronism.

All the transitions between said synchronization stages occur under the control of the instantaneous conditions of the memory 63, while furthermore the transition from stage *a* to stage *b* is effected by the first test pulse of the test pulse generator 56 which occurs in stage a, the transition from stage *b* to stage *c* is effected by a pulse from the series of equidistant pulses of the pulse pattern converter 48 which occurs prior to or at the instant of the next following test pulse of the test pulse generator 56 in stage *b*, while said test pulse effects the return from stage *b* to stage *a* when a pulse fails from the said series of equidistant pulses during the above-mentioned time interval, the transition from stage *c* to stage *d* is effected by a pulse from the series of equidistant pulses of the pulse pattern converter 48 which occurs at the instant of the first test pulse of the test pulse generator 56 in stage *c*, while said test pulse effects the return from stage *c* to stage *a* when a pulse fails from the said series of equidistant pulses at the above-mentioned instant, the return from stage *d* to state *a* is effected by an error pulse of the error counter 59.

The control circuit 62 in each return to stage *a* also supplies a control pulse to release the setting circuit 35 of the channel distributor 21 and furthermore supplies in each transition from stage *b* to stage *c* a reset pulse to reset the test pulse generator 56 to its initial position.

In the receiver shown in FIG. 1 the memory 63 is constructed by means of two bistable triggers 64, 65, the conditions of which unambiguously denote the various synchronization stages. If the operating condition of each of the bistable triggers 64, 65 is denoted by "1" and the rest condition by "0," then the relation between the trigger conditions and the synchronization stages for the embodiment shown can be represented in the table below

| synchronization stage | condition | |
|---|---|---|
| | trigger 64 | trigger 65 |
| a. synchronism absent | 0 | 0 |
| b. testing stage | 1 | 0 |
| c. checking stage | 0 | 1 |
| d. synchronism | 1 | 1 |

The construction of the control circuit 62 is not shown in detail in FIG. 1 but will be described in detail with reference to a detailed example shown in FIG. 2.

As a result of the action of the pulse pattern converter 48, a series of equidistant pulses of periodicity T will appear at the output 54 of the threshold device 53 only when the synchronization pulse pattern is supplied. When the channel distributors 6, 21 in the transmitter and the receiver are in synchronism and hence the bistable triggers 64, 65 are in the condition (1, 1) associated with synchronism (stage *d*), then, under influence of the continuous supply of the equidistant pulse series, the error counter 59 is held in its initial position by the test pulses of the test pulse generator 56. So the error counter 59 supplies no error pulse so that the control circuit 62 remains in the condition (1, 1) in which it generates no control signal and the setting circuit 35 of the channel distributor 21 remains blocked.

No equidistant pulse series appears at the output 54 of the threshold device 53 when any pulse patterns other than the required pulse pattern or a close approximation thereof is applied, for example, originating from a signal channel. However, in this case a signal is continuously present at the output 55 of the threshold device 53, which signal keeps the AND-gate 61 opened for the test pulses of the test pulse generator 56, which test pulses are counted in the error counter 59, so that said error counter 59 reaches its final position and supplies an error pulse to the control circuit 62. This error pulse then effects a return of the bistable triggers 64, 65 to the condition (0, 0) associated with absent synchronism (stage *a*). When the triggers 64, 65 return to said condition (0, 0) under the influence of said error pulse, which always coincides with a test pulse, the control circuit 62 supplies a control pulse for releasing the setting circuit 35 in the channel distributor 21 during the next following signal cycle. For that purpose, the test pulse appearing at the output 58 in the initial position of the test pulse generator 56 is applied to the control circuit 62, so that the control circuit 62 can supply a control pulse only during the first signal cycle in this condition (0, 0) of the triggers 64, 65 which pulse is transmitted to the setting circuit 35, through a pulse shaper 66, to form a pulse of short duration (shorter than a local clock pulse of the clock pulse generator 18). In the setting circuit 35 these short control pulses serve as reset pulses for a bistable trigger 67 to which the local clock pulses are applied as set pulses. In the absence of the control pulses, the local clock pulses keep the bistable trigger 62 in its operating condition, in which the trigger 67 supplies a control signal which keeps the AND-gate 36 opened for the local clock pulses, whereas a control pulse resets the bistable trigger 67 to its rest condition, in which the trigger 67 supplies no control signal and the AND-gate 36 is closed for the local clock pulses. The channel distributor 21 in the receiver then remains in a particular position, while the channel distributor 6 in the transmitter switches to the next position. The local clock pulse immediately succeeding the control pulse resets the bistable trigger 67 to its operating condition, so that the channel distributor 21 in the receiver then switches again under the control of the local clock pulses until a following control pulse is applied by the control circuit 62, the described setting of the channel distributor 21, in this case: delay over one interval of the signal cycle, being repeated. These changes of the setting of the channel distributor 21 are repeated until the channel distributors 6, 21 in the transmitter and the receiver are in synchronism, the control circuit 62, as a result of the continuous supply of the synchronization pulse pattern to the pulse pattern converter 48, being prevented from supplying control pulses to the setting circuit 35, and the setting circuit 35 which is then blocked effecting no further setting of the channel distributor 21. So the control circuit 62 serves as an inhibiter for the test pulse at the output 58 of the test pulse generator 56 from which the short control pulse is derived, the inhibitor being opened only in the condition (0, 0) of the bistable triggers 64, 65, hence only in stage *a*.

The resynchronization from absent synchronism (stage *a*) to full synchronism (stage *d*) occurs as follows:

When the two bistable triggers 64, 65 return to the condition (0, 0) associated with stage *a* under the influence of an error pulse which always coincides with the test pulse appearing at the output 57 in the final position of the test pulse generator 56, the setting circuit 35 sets the channel distributor 21 at a new interval of the received signal cycle during the next following signal cycle in a stage *a* under the control of the test pulse appearing at the output 58 in the initial position of the test pulse generator 56. The pulses derived from this new interval are now shifted during 6 successive channel clock pulse periods in the 6 elements of shift register 49, while the test pulse generator 56 which reaches its output stage just with the sixth channel clock pulse then supplies a test pulse to the output 57, which test pulse in this condition (0, 0) of the bistable 64, 65 is applied as a set pulse to the trigger 64 and thus effects the transition from absent synchronism (stage *a*, condition: 0, 0) to the testing stage (stage *b*, condition: 1, 0).

Since the synchronization pulse pattern in a length of 7 pulses can appear in 7 different phases and a pulse at the output 54 of the threshold device 53 can appear only in the phase determined by the resistance network 50 of the pulse pattern converter 48, it is necessary in the testing stage *b* to test in each channel clock pulse period 7 successive channel clock pulse periods, so over a pull period T of the synchronization pulse pattern, whether the new pulse pattern is the desired synchronization pulse pattern or not. When during this whole time interval of length T no pulse appears at the output 54, the decision follows that this new pulse pattern cannot be accepted as the synchronization pulse pattern and a following interval of the received signal cycle has to be tested. For that purpose, the test pulse appearing just at the end of this time interval of length T at the output 57 of the test pulse generator 56, together with the signal which is just present at the output 55 of the threshold device 53 when a pulse fails at the output 54, is used in this condition (1, 0) of the triggers 64, 65 to reset the trigger 64 to its rest condition and thus to effect the return from the testing stage *b* to the stage *a* of absent synchronism (condition: 0, 0). When the triggers 64, 65 return to this condition (0, 0) the control circuit 62, as explained above, supplies a control pulse for releasing the se setting circuit 35 which sets the channel distributor 21 at a new interval of the received signal cycle, after which the cycle as described above can be repeated.

When, however, in testing stage *b* prior to or at the instant of the test pulse which appears just at the end of the said time interval of length T, a pulse does appear at the output 54 of the threshold device 53, the decision follows that the new pulse pattern can be accepted for the time being as the synchronization pulse pattern (conditional acceptance). For this purpose, this pulse at the output 54 of the threshold device 53 is used in this condition (1, 0) of the triggers 64, 65 to reset on the one hand the trigger 64 to its rest condition and on the other hand to set the trigger 65 to its operating condition and thus to effect the transition from the testing stage *b* to the checking stage *c* (condition: 0, 1). The return of trigger 64 to its rest condition is also used to generate a pulse which is supplied to the test pulse generator 56 as a reset pulse, so that the phase of the test pulses at the output 57 corresponds to the phase of the new pulse pattern which latter phase is determined by the resistance network 50 of the pulse pattern converter 48. Thus it is ensured that with definite acceptance of this new pulse pattern as the synchronization pulse pattern, the series of equidistant pulses at the output 54 of the threshold device 53 coincides with the series of test pulses at the output 57 of the test pulse generator 56.

In the checking stage *c* (condition: 0, 1) it is tested whether the provisionally accepted pulse pattern has indeed the same periodicity as the synchronization pulse pattern by testing whether after a time interval equal to the period T of the synchronization pulse pattern the pulse to be expected with the synchronization pulse pattern appears indeed at the output 54 of the threshold device 53. When the expected pulse appears at the output 54, the decision follows that the new pulse pattern can be accepted definitely as the synchronization pulse pattern. For this purpose, said pulse at the output 54, together with the test pulse then just appearing at the output 57 of the test pulse generator 56, is used in this condition (0, 1) of the triggers 64, 65 to set the trigger 64 in its operating condition, and thus to effect the transmission from the checking stage *C* to the stage *D* of full synchronism (condition: 1, 1).

However, if the pulse to be expected at the output 54 does not appear, the decision follows that the conditionally accepted new pulse pattern cannot be maintained as the synchronization pulse pattern and a following interval of the received signal cycle has to be tested. For that purpose, the test pulse at the output 57 of the test pulse generator 56, together with the signal which is then present at the output 55 of the threshold device 53, is used in this condition (0, 1) of the triggers 64, 65 to reset the trigger 65 to its rest condition and thus to effect the return from the checking stage *C* to the stage *A* of absent synchronism (condition: 0,0). As explained above, said return to stage *A* results in a change of the setting of the channel distributor 21 after which the cycle described thus far can be repeated.

Once the bistable triggers 64, 65 in stage *D* are in the condition (1, 1), no change in this condition can occur, as already described in detail above, as a result of the continuous supply of the equidistant pulse series of the pulse pattern converter 48, since the error counter 59 is kept in its initial position and can supply no error pulse so that the control circuit 62 in turn remains in the condition (1, 1) in which no control pulse is supplied and the setting circuit 35 of the channel distributor 21 remains blocked.

By using the measures according to the invention it is reached in this manner in the delta modulation time division multiplex system shown that reliable synchronization is obtained in all circumstances, and, in addition, a very short searching time is realized while the reliability is maintained, as will now be described in greater detail. In this detailed description, the presence of a pulse in a pulse pattern will be denoted by "1" and the absence of a pulse will be denoted by "0"

The synchronization pulse pattern used in this time division multiplex system which in an arbitrary time interval of the length of its period has the following form, (compare time diagram 45 in FIG. 1):

000 1011 is distinguished unambiguously from the signal pulse pattern which may occur in all operating conditions of the speech channels $C_1$–$C_{15}$ at the transmitter end and which, when using delta modulation, may be subdivided into the following types:

a. rest patterns which occur in the absence of a speech signal, for example, during a speech pause, and which may have the following forms:

1010101010101010

1100110011001100 b. defect patterns which occur in the case of failure of a channel $C_1$ – $_{15}$ or in the case of overload of a delta-modulator 3, 4, in which the pulses are continuously present or continuously absent for long time intervals.

c. speech patterns in which the pulses are present and absent in an alternation fully determined by the form of the speech signal to be transmitted.

In considering the above signal pulse patterns it appears that in all cases occurring in delta modulation, the alternation of presence and absence of the pulses in the signal pulse patterns has an ordered character, whereas in the synchronization pulse pattern considered over an arbitrary time interval of the length of its period T, the pulses are present or absent in a pseudorandom alternation.

At the receiver end also the synchronization pulse pattern is distinguished unambiguously from all the signal pulse patterns, in which as a result of interferences in the transmission path 11, interference pulses occur which manifest themselves in the regenerated signal pulse patterns by suppression or addition of pulses. Actually, also in the case of very high probabilities of interference, for example, of 1:10, the average time between two successive interference pulses in a signal pulse pattern of a speech channel $C_1$–$C_{15}$ is considerably longer than the average time between two successive signal pulses, so that the interference pulses influence the natural ordered character of the signal pulses only very slightly. Likewise, the interference pulses have only a very small influence on the pseudorandom character of the synchronization pulse pattern and therefore the significant distinction between the synchronization pulse pattern and the signal pulse patterns occurring in all operating conditions is reduced only to a very small extent by the interferences in the transmission path 11.

While using this significant distinction it is made possibile to distinguish the synchronization pulse pattern in the receiver very rapidly and with great certainty by means of the pulse pattern converter 48 which generates a series of equidistant pulses only when the synchronization pulse pattern is applied. Actually, after the return to stage *a* of absent synchronism the transition to testing stage *b* takes place already within a period T of the synchronization pulse pattern. It is then tested in stage *b* during a time interval which is at most equal to T whether the new pulse pattern can be accepted for the time being or must be rejected so that this decision takes place already within a time interval 27 after the return to stage *a*. If the conditionally accepted pulse pattern satisfies the periodicity checking in stage *c* after a period T, the transition to stage *d* of full synchronism thus occurs within a time interval 3T after the return to the stage *a*.

By using the measures according to the invention, the synchronism of the channel distributors 6 and 21 in the transmitter and the receiver is achieved with great certainty in this manner in a short period of time even with probabilities of interference of the 1:10. When the very high probability of interference and the probabilities of the transitions between the various synchronization stages are taken into account, it is found, even in the most unfavorable case in which all the intervals of a signal cycle have to be tested before the synchronization interval is found, that, to obtain synchronism, a time interval equal to four times the average time necessary to test a full signal cycle is amply sufficient. For the example shown in which the number of channels is 16 and the synchronization pulse pattern has a period T=7D, where D is the channel clock pulse period of 0.05 m.sec., this means that even with a probability of interference of 1:10 after approximately 60 m.sec., synchronism is obtained, which short searching time falls well within the range of approximately 1 sec. which is permissible for the transmission of speech signals.

The control circuit 62 which in FIG. 1 is shown only diagrammatically will now be described in greater detail with reference to FIG. 2 in which, for clearness ' sake the adjoining parts of the control circuit 62 are again shown and bear the same reference numerals as in FIG. 1.

Figure 2:
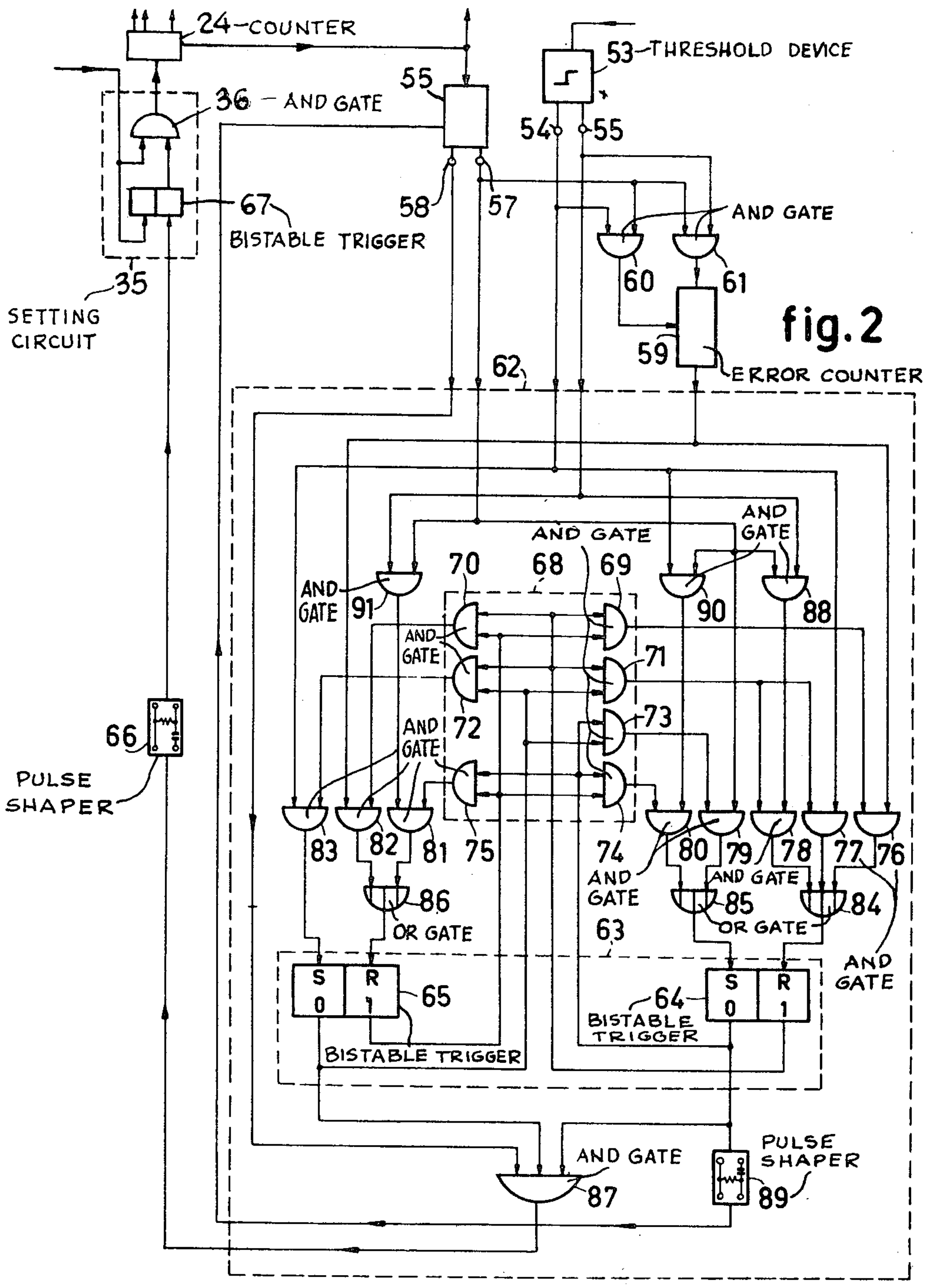
FIG. 2 shows an embodiment of the control circuit of the synchronism detector of the receiver in greater detail.

As already shown in FIG. 1, the memory 63 is constructed with two bistable triggers 64, 65, in which in FIG. 2 the outputs at which a signal occurs in the operating condition are denoted by "1" and the outputs at which a signal occurs in the rest condition are denoted by "0," the set inputs being denoted by S and the reset inputs by R.

It has been described in detail above that all the transitions between the various synchronization stages, so between the conditions of the triggers 64, 65, take place under the control of the instantaneous conditions of the memory 63. For that purpose, in the control circuit 62 in FIG. 2, the outputs "1", "0" of the trigger 64, 65 are connected to a condition indicator 68 which in the example is formed by a number of AND-gates 69, 70; 71, 72; 73, 74; 75 in which a signal is present at the output of AND-gates 69, 70 in the condition (1, 1) of the triggers 64, 65 in the memory 63, at the output of AND-gates 71, 72 in the condition (1, 0), at the output of AND-gate 73 in the condition (0, 0) and at the output of AND-gates 74, 75 in the condition (0, 1). The condition signals present at the output of the AND-gates 69–75 in the condition indicator 68 are now used as gate signals for a number of AND-gates 76, 77, 78; 79, 80; 81, 82; 83 which are connected to the reset input R of the trigger 64 through an OR-gate 84, to the set input S of the trigger 64 through an OR-gate 85, to the reset input R of the trigger 65 through an OR-gate 86, and directly to the set input S of the trigger 65, respectively.

The control of the triggers 64, 65 by the output signals of the threshold device 53 in the pulse pattern converter 48, the test pulse generator 56, and the error counter 59 will now be described with reference to a resynchronization from full synchronism (stage *d*) via absent synchronism (stage *a*), testing (stage *b*), checking (stage *c*) to full synchronism (stage *d*).

As already described in detail above the error counter 59 reaches its final position when in the case of synchronism (stage *d*, condition: 1, 1) the maximum permissible number of successive errors has occurred and then supplies an error pulse. This error pulse is supplied as a reset pulse to the reset input R of the two triggers 64, 65 via the AND-gates 76, 82 which are kept opened in the condition (1,1) by the AND-gates 69, 70 in the condition indicator 68. The two triggers 64, 65 now return to their rest condition, so that the memory 63 assumes the condition (0, 0) associated with absent synchronism (stage *a*). Since, in accordance with the explanation given with reference to FIG. 1, the control circuit 62 may supply a short control pulse only during the first signal cycle in stage *a* through pulse shaper 66 for releasing the setting circuit 35 of the channel distributor 21, the output "0+ of the two triggers 64, 65 is connected to an AND-gate 87 which thus is opened only in the condition (0, 0) for the test pulse at the output 58 of the test pulse generator 56 which is also supplied to said AND-gate 87.

When the channel distributor 21 has adjusted in the above-described manner to a new interval of the received signal cycle and the test pulse generator 56 after 6 pulses of this new interval has just reached its final position, the test pulse at the output 57 is applied as a set pulse to the set input S of the trigger 64 via the AND-gate 79 which in the condition (0, 0) is kept opened by the AND-gate 73 in the condition indicator 68. The trigger 64 now assumes its operating condition so that the memory 63 is in the condition (1, 0) associated with the testing stage *b*.

In this testing stage *b* it is tested in the manner already described with reference to FIG. 1 during a time interval of the length T whether the new pulse pattern can be accepted for the time being or not. When in this time interval no conditional acceptance takes place, the test pulse at the output 57, together with the signal at the output 55 of the threshold device 53, is used, as already explained, at the end of this time interval to set the trigger 64 in its rest condition. For that purpose, this test pulse at the output 57 and the signal at the output 55 are applied to an AND-gate 88, the output signal of which is applied as a reset pulse to the reset input R of the trigger 64 via AND-gate 78, which in the condition (1, 0) is kept opened by the AND-gate 71 in the condition indicator 68, so that said trigger returns to its rest condition. As a result of this the memory 63 again assumes the condition (0, 0) associated with absent synchronism (stage *a*) after which the cycle described can be repeated.

If, however, a conditional acceptance takes place prior to or at the latest at the end of this time interval in testing stage *b*, the trigger 64 is set to its rest condition and simultaneously the trigger 65 is set to its operating condition, as already described above. For that purpose the pulse at the output 54 of the threshold device 53 is applied, on the one hand through the AND-gate 77 which in the condition (1, 0) is also kept opened by the AND-gate 71 in the condition indicator 68, as a reset pulse to the reset input R of the trigger 64, and, on the other hand, through the AND-gate 83, which in the condition (1, 0) is also kept opened by the AND-gate 72 in the condition indicator 68, is applied as a set pulse to the set input S of the trigger 65. The transition of the triggers 64, 65 to their rest condition and operating condition, respectively, thus results in the transition of the memory 63 to the condition (0, 1) associated with the checking stage *c*. As explained, the return of the trigger 64 to its rest condition is used to produce a pulse through a pulse shaper 89 at the output "0" of the trigger 64 which pulse is applied as a reset pulse to the test pulse generator 56, so that the test pulses at the output 57 and the conditionally accepted pulse pattern correspond in phase.

As already explained above the conditionally accepted pulse pattern is subjected to a periodicity checking in the checking stage *c*. If the conditionally accepted pulse pattern at the end of the first time interval of length T in the stage *c* satisfies said periodicity checking, the trigger 64 is set in its operating condition. For that purpose the pulse at the output 54 of the threshold device 53 is applied, together with the test pulse at the output 57, to an AND-gate 90 the output signal of which is applied, through the AND-gate 80 which in the condition (0,1) is kept opened by the AND-gate 74 in the condition indicator 68, as a set pulse to the input S of the trigger 64. The trigger 64 then assumes its operating condition, so that the memory 63 comes in the condition (1, 1) associated with full synchronism (stage *d*) and resynchronization is completed.

However, if this conditionally accepted pulse pattern does not satisfy the periodicity checking, he trigger 65 is reset to its rest condition. For that purpose, the signal at the output 55 of the threshold device 53 is applied, together with the test pulse at the output 57, to an AND-gate 91 the output signal of which is applied, through the AND-gate 81 which in the condition (0, 1) is also kept opened by the AND-gate 75 in the condition indicator 68, as a reset pulse to the reset input R of the trigger 65. The trigger 65 then returns to its rest condition, so that the memory 63 again assumes the condition (0, 0) associated with absent synchronism (stage *a*) after which the above-described cycle can be repeated until full synchronism (stage *d*) is obtained.

From the above explanation it appears once again that the resynchronization cycle is fully controlled from the conditions of the memory 63 formed by the bistable triggers 64, 65, the condition indicator 68 of said memory commanding the control of said triggers 64, 65 by the output signals of the threshold device 53, the test pulse generator 56 and the error counter 59 in such manner that undesired transitions between the various synchronization stages are avoided.

In this manner a synchronism detector is obtained which very rapidly distinguishes the received synchronization pulse pattern so that in the various synchronization stages the transition to a following synchronization stage can rapidly be decided and consequently a particularly short searching time can be realized, which synchronism detector, in spite of this short searching time, ensures a very reliable synchronism also in the case of very high probabilities of interference.

What is claimed is:

1. A transmission system comprising a transmitter and a receiver for the transmission of a number of signals in time division multiplex and by means of pulse code modulation, in particular delta modulation, the transmitter comprising channels which are operative in time division multiplex and consist of a number of signal channels and at least one synchronization channel, in which transmitter the signal pulses originating from the various signal channels and the synchronization pulses originating from the synchronization channel are cyclically distributed in each signal cycle, within which a number of signal intervals and also a synchronization interval occur in a cyclic sequence, over the separate intervals by means of a channel distributor, all the transmitted pulses being equal mutually and coinciding with various pulses from a series of equidistant clock pulses, the receiver comprising a click frequency extractor for recovering the series of clock pulses from the received multiplex signals and furthermore a number of channels corresponding to the number of channels in the transmitter and also consisting of a number of signal channels and at least one synchronization channel, the received multiplex signals being distributed cyclically over the separate channels by means of a channel distributor under the control of the recovered clock pulses, the synchronization channel comprising a synchronism detector which controls a setting circuit in the channel distributor, said settings circuit being blocked in the case of synchronism of the channel distributors in the transmitter and the receiver and, in the case of absent synchronism, setting the channel distributor in the receiver always at a different interval of the received signal cycle, characterized in that a pulse pattern generator is included in the synchronization channel of the transmitter to generate a periodic synchronization pulse pattern which, considered already over a time interval equal to its own period and for all the operating conditions of the signal channels, is uncorrelated with the signal pulses originating from said signal channels, the synchronism detector in the receiver comprising the following elements:

1. a pulse pattern converter provided with a shift register, the content of which is shifted under the control of the recovered clock pulses, which pulse pattern converter converts the received synchronization pulse pattern into a series of equidistant pulses;
2. a test pulse generator which supplies test pulses having a recurrence period equal to an integral number of times the period of the synchronization pulse pattern;
3. an error counter which allows changes of its position only at instants determined by the test pulses, which error counter supplies an error pulse exclusively when a predetermined number of immediately succeeding pulses from the series of equidistant pulses of the pulse pattern converter fails;
4. a control circuit connected to the setting circuit of the channel distributor and comprising a memory which has four different conditions which each correspond to only one of the following synchronization stages;
   a. synchronism absent,
   b. testing stage,
   c. checking stage,
   d. synchronism, in which all the transitions between the synchronization stages occur under the control of the instantaneous memory conditions, and furthermore the transition from stage *a* to stage *b* is effected by the first test pulse which occurs in stage *a*, the transition from stage *b* to stage *c* is effected by a pulse from the series of equidistant pulses of the pulse pattern converter which occurs prior to or at the instant of the next following test pulse in stage *b*, said test pulse effecting the return from stage *b* to stage *a* when a pulse from the series of equidistant pulses fails during the above-mentioned interval, the transition from stage *c* to stage *d* is effected by a pulse from the series of equidistant pulses of the pulse pattern converter which occurs at the instant of the first test pulse in stage *c*, said test pulse effecting the return from stage *c* to stage *s* when a pulse from said series of equidistant pulses fails at the above-mentioned instant, the return from stage *d* to stage *a* is effected by an error pulse from the error counter, the control circuit supplying a control pulse in each return to stage *a* for releasing the setting circuit of the channel distributor and the control circuit furthermore supplying a reset pulse in each transition from stage *b* to stage *c* to reset the test pulse generator to its initial position.

2. A receiver suitable for use in a transmission system as claimed in claim 1, in which the receiver comprises a clock frequency extractor for recovering the series of clock pulses from the received multiplex signals and furthermore a number of channels corresponding to the number of channels in the transmitter consisting of a number of signal channels and at least one synchronization channel, the received multiplex signals being distributed cyclically over the separate channels by means of a channel distributor under the control of the recovered click pulses, the synchronization channel comprising a synchronism detector which controls a setting circuit in the channel distributor, said setting circuit being blocked in the case of synchronism of the channel distributors in the transmitter and the receiver and, in the case of absent synchronism, setting the channel distributor in the receiver always at a different interval of the received signal cycle, characterized in that the synchronism detector in the receiver comprises the following elements:

1. a pulse pattern converter provided with a shift register, the content of which is shifted under the control of the recovered clock pulses, which pulse patterns converter converts the received synchronization pulse pattern into a series of equidistant pulses;
2. a test pulse generator which supplies test pulses having a recurrence period equal to an integral number of times the period of the synchronization pulse pattern;
3. an error counter which allows changes of its position only at instants determined by the test pulses, which error counter supplies an error pulse exclusively when a predetermined number of immediately succeeding pulses from the series of equidistant pulses of the pulse pattern converter fails;
4. a control circuit connected to the setting circuit of the channel distributor and comprising a memory which has four different conditions which each correspond to only one of the following synchronization stages:
   a. synchronism absent,
   b. testing stage,
   c. checking stage,
   d. synchronism, in which all the transitions between the synchronization stages occur under the control of the instantaneous memory conditions, and furthermore the transition from stage *a* to stage *b* is effected by the first test pulse which occurs in stage *a*, the transition from stage *b* to stage *c* is effected by a pulse from the series of equidistant pulses of the pulse pattern converter which occurs prior to or at the instant of the next following test pulse in stage *b*, said test pulse effecting the return from stage *b* to stage *a* when a pulse from the series of equidistant pulses fails during the above-mentioned interval, the transition from stage *c* to stage *d* is effected by a pulse from the series of equidistant pulses of the pulse pattern converter which occurs at the instant of the first test pulse in stage *c*, said test pulse effecting the return from stage *c* to stage *a* when a pulse from said series of equidistant pulses fails at the above-mentioned instant.

the return from stage *d* to stage *a* is effected by an error pulse from the error counter, the control circuit supplying a control pulse in each return to stage *a* for releasing the setting circuit of the channel distributor and the control circuit furthermore supplying a reset pulse in each transition from stage *b* to stage *c* to reset the test pulse generator to its initial position.

3. A receiver as claimed in claim 2, characterized in that the pulse pattern converter comprises a threshold device having a first output for the series of equidistant pulses and a second output at which a signal appears which is the inverse of that at the first output and each of the two outputs is connected to an input of a separate AND-gate to which are also applied the test pulses of the test pulse generator, the AND-gate connected to the said first output being connected to the reset input of the error counter and the AND-gate connected to the said second output being connected to the counter input of the error counter.

4. A receiver as claimed in claim 2, wherein the memory in the control circuit is formed by two bistable triggers and each bistable trigger has a separate output for each of its two conditions at which in the condition in question, a signal is present, said output of the two triggers at which in stage *a* a signal is present being connected to an AND-gate to which are also applied the test pulses of the test pulse generator, the output of said AND-gate being connected to the setting circuit of the channel distributor through a pulse shaper, that output of one of the two triggers at which in the transition from stage *b* to stage *c* a signal will appear being connected to the test pulse generator through a pulse shaper for resetting the test pulse generator to its initial position.

5. A receiver as claimed in claim 2, wherein a condition indicator having a separate output for each condition of the memory is connected to the memory in the control circuit, at which output a signal is present only in the relative condition of the memory, the output signals of the condition indicator commanding, by means of AND-gates controlled by said output signals, the supply of output signals of the pulse pattern converter, the test pulse generator, and the error counter to the memory for varying its condition.

* * * * *